United States Patent
Ward et al.

[11] Patent Number: 6,055,232
[45] Date of Patent: Apr. 25, 2000

[54] TELECOMMUNICATIONS NETWORK ARCHITECTURE DEPLOYING INTELLIGENT NETWORK SERVICES IN A LEGACY NETWORK

[75] Inventors: Ronald L. Ward, Flower Mound; Walter C. Robertson, Jr., Richardson; Kevin W. Hager, Flower Mound, all of Tex.

[73] Assignee: Alcatel USA Sourcing, L.P., Plano, Tex.

[21] Appl. No.: 08/912,039

[22] Filed: Aug. 15, 1997

[51] Int. Cl.[7] .......................... H04L 12/50; H04Q 11/00; H04M 7/00

[52] U.S. Cl. .......................... 370/385; 370/353; 370/400; 379/229

[58] Field of Search .................................. 370/522, 524, 370/410, 420, 400, 406; 379/229, 230

[56] References Cited

U.S. PATENT DOCUMENTS

| | | | |
|---|---|---|---|
| 5,495,484 | 2/1996 | Self et al. | 370/110.1 |
| 5,610,910 | 3/1997 | Focsaneanu et al. | 370/351 |
| 5,640,387 | 6/1997 | Takahashi et al. | 370/359 |
| 5,867,570 | 2/1999 | Bargout et al. | 379/230 |
| 5,878,128 | 3/1999 | Kantola | 379/230 |
| 5,889,848 | 3/1999 | Cookson | 379/230 |

FOREIGN PATENT DOCUMENTS

| | | | |
|---|---|---|---|
| 9516321 | 6/1995 | WIPO | H04M 3/42 |

OTHER PUBLICATIONS

W.F. Seigneur, "The Robust Open Architecture Distributed Switching Model: Building the Network Operating System for the Information Superhighway", Annual Review of Communications, vol. 49, No. 1, Jan. 1, 1996, pp. 637–651.

J. Thomson, "Adjunct Based Operations of Digital Loop Carrier Technology in an Intelligent Network", IEEE, Dec., 1991, pp. 1656–1660.

W. Fred Seigneur, "The ROADS Model: The Computer Industry Redefines Telecom", WCF 96, W–67–D, 1996 conference.

*Primary Examiner*—Huy D. Vu
*Assistant Examiner*—M. Phan
*Attorney, Agent, or Firm*—Baker Botts L.L.P.

[57] ABSTRACT

A telecommunications network (10) for providing intelligent network services includes a distributed switching system (19) having a call control computing platform (12) coupled to a digital loop carrier (16), where the digital loop carrier (16) is coupled to a plurality of customer premises equipment (18). A local switch (30) is coupled to the digital loop carrier (16), and at least one service control point (40, 42) is coupled to the call control computing platform (12) and the local switch (30). The at least one service control point (40, 42) contains service definitions and logic of both legacy services and intelligent network services.

13 Claims, 5 Drawing Sheets

TELECOMMUNICATIONS NETWORK ARCHITECTURE DEPLOYING INTELLIGENT NETWORK SERVICES IN A LEGACY NETWORK

RELATED PATENT APPLICATION

This patent application is related to pending U.S. patent application Ser. No. 08/699,160, titled Distributed Local Services Telecommunications Switching System, filed on Aug. 16, 1996, Attorney Docket No. 036560.5267.

This patent application is also related to copending U.S. patent application Ser. No. 08/912,016 pending, titled Telecommunications Network Architecture Enabling Local Services Resale in a Legacy Network, filed on Aug. 15, 1997, Attorney Docket No. 036560,5465; and U.S. patent application Ser. No. 08/912,037 pending, titled Telecommunications Network Architecture Deploying Intelligent New Services in a Legacy Network, filed on Aug. 15, 1997, Attorney Docket No. 036560.5977.

TECHNICAL FIELD OF THE INVENTION

This invention is related in general to the field of telephony. More particularly, the invention is related to a telecommunications network architecture deploying digital loop carrier as a switching platform.

BACKGROUND OF THE INVENTION

Local services are typically provided in today's telecommunications network by a class 5 switching system. The class 5 switch is a monolithic system generally containing a central computing unit, matrix, line modules, trunk modules, and service circuits. These components are typically tightly coupled forming a proprietary control architecture controlled by the central computing unit.

The digital loop carrier is being widely deployed to connect business and residential telephone customers to the class 5 central office switch. However, today's central office switching systems were not initially designed with digital loop carriers or fiber optic loop equipment in mind. Nor were they designed for long holding times, extensive intelligent network signaling loads, or multimedia control. In particular, long call hold times related to the rapid rise in the volume of data calls, have resulted in increased service blockages in the end office switches.

Further, class 5 switching systems generally contain a number of standard local services or features such as Class, Centrex, and Operator Services. Because of its monolithic and tightly coupled architecture, the class 5 switching system is usually comprised of components supplied by a single equipment manufacturer. Thus, when new services or features are desired, a network operator must request their implementation from the class 5 switch manufacturer. Due to the monolithic nature of the class 5 switching system, service and feature implementation are generally tightly coupled to the architecture of the switch. Therefore, new services and features are usually very costly to implement and require significant time to market. These costs and lead times for software upgrades led to the industry architecture known as Advanced Intelligent Network in the late 1980s as a way for local exchange carriers (LECS) to gain control of software development for new features. This process itself has been largely ineffective due to slow deployment and high costs.

With the passage of the Telecom Bill and deregulation of the industry, it is now possible for new players to enter into the local loop and provide competitive local services. However, a hurdle for many of these new players is that they do not own facilities or the loop plant that connect the telephone customers to the switching equipment. To install such lines to the customers would be a very cost-prohibitive proposition. Accordingly, there is a need to circumvent this barrier and provide a solution therefor.

SUMMARY OF THE INVENTION

Accordingly, there is a need for adding new intelligent network services to a legacy network without costly and time-consuming efforts spent in modifying the legacy switch.

In accordance with the present invention, a telecommunications network architecture deploying intelligent network services in a legacy network is provided, which eliminates and substantially reduces the disadvantages of prior networks.

In one aspect of the invention, a telecommunications network for providing intelligent network services includes a distributed switching system having a call control computing platform coupled to a digital loop carrier, where the digital loop carrier is coupled to a plurality of telephone service subscribers. A local switch is coupled to the digital loop carrier, and at least one service control point is coupled to the call control computing platform and the local switch. At least one service control point contains service definitions and logic of both legacy services and intelligent network services.

In another aspect of the invention, a telecommunications network for providing intelligent network services in a legacy network includes at least one digital loop carrier coupled to a plurality of telephone service subscribers, a call control computing platform coupled to at least one digital loop carrier, where the call control computing platform is adapted to control and manage the operations of at least one digital loop carrier. An intelligent peripheral is further coupled to the call control computing platform and at least one digital loop carrier to provide tone and announcement and digit collection functions. A local switch is coupled to at least one digital loop carrier. A first service control point is coupled to the call control computing platform and the local switch, and containing service definitions and logic of legacy services, and a second service control point is coupled to the call control computing platform and the local switch, and containing service definitions and logic of new intelligent network services.

In yet another aspect of the invention, a method for providing new intelligent network services to a legacy network includes the steps of monitoring for line events occurring on a plurality of subscriber lines coupled to a digital loop carrier, and providing dial tone and collecting dialed digits for a call on one of the plurality of subscriber lines in response to an off-hook event thereon. Then it is determined whether the call requires legacy service or a new intelligent network service, and the call is routed to a local switch for call processing and routing in response to the call requiring legacy service, and the call is processed in a service unit coupled to the digital loop carrier in response to the call requiring new intelligent network services.

A technical advantage of the present invention enables the provision and deployment of new intelligent network services without expensive and time-consuming upgrade efforts of the legacy switch.

BRIEF DESCRIPTION OF THE DRAWINGS

For a better understanding of the present invention, reference may be made to the accompanying drawings, in which.

DETAILED DESCRIPTION OF THE INVENTION

Figure 1:
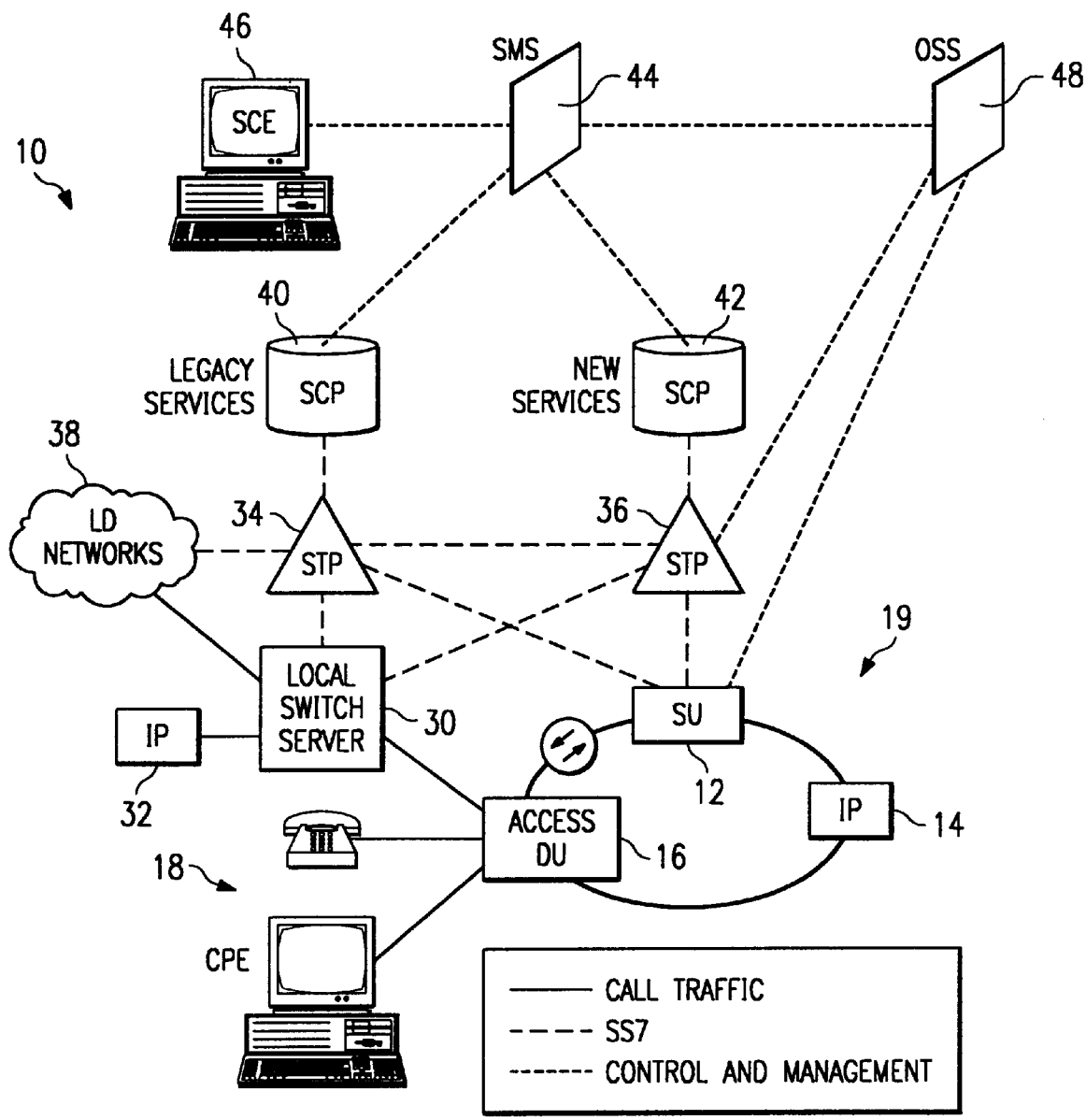
FIG. 1 is a simplified block diagram of an embodiment of a telecommunications network architecture providing for the addition of intelligent network services to a legacy network according to the teachings of the present invention.

The preferred embodiments of the present invention are illustrated in FIGS. 1–5, like reference numerals being used to refer to like and corresponding parts of the various drawings.

FIG. 1 is a simplified block diagram of an embodiment of a telecommunications network architecture 10 providing for the addition of intelligent network services to a legacy network according to the teachings of the present invention. Telecommunications network 10 includes a service unit (SU) 12, which is coupled to an intelligent peripheral (IP) 14 and at least one access delivery unit (DU) 16. Intelligent peripheral 14 may be integrated with service unit 12. Access delivery unit 16 may be a digital loop carrier which is coupled to a plurality of telephone service customers or customer premises equipment (CPE) 18.

Digital loop carrier 16 may include a central office terminal (not shown) coupled with a remote terminal (not shown) with fiber or metallic cabling in the feeder network, as well as a host digital terminal stand-alone configuration in the wirecenter. Typically, digital loop carrier 16 includes channel banks and a time-slot-interchange (TSI) fabric. Digital loop carrier 16 may also provide integrated services digital network (ISDN) basic rate interface (BRI) and asymmetrical digital subscriber line (ADSL)/integrated digital subscriber line (IDSL) capabilities.

Service unit 12 is preferably a general purpose computing platform that performs the call control, screening, and management functions, and may interact with the SS7 signaling network and external network management or operations systems. Digital loop carrier 16 acts as a switching unit of a distributed switching system 19 under the control of service unit 12. Intelligent peripheral 14 is a specialized computing platform that includes tone and announcement facilities, dialed digit receivers, and digit senders. Intelligent peripheral 14 thus provides central office call processing functions such as providing dial tone, dual tone multi-frequency (DTMF) digit monitoring and collection, and playing pre-recorded voice announcements. For a more detailed description of the distributed switch architecture, service unit, and delivery unit, please refer to U.S. Pat. No. 5,495,484 issued to Self et al. on Feb. 27, 1996 and titled Distributed Telecommunications Switching System, incorporated herein by reference. For a more detailed description of a distributed switching system adapted for local services, please refer to pending U.S. patent application Ser. No. 08/699,160, titled Distributed Local Services Telecommunications Switching System, filed on Aug. 16, 1996, Attorney Docket 036560.5267, also incorporated herein by reference.

Access delivery unit 16 is coupled to a local switch server 30. Local switch server 30 is a service switching point (SSP) that may interface with access delivery unit 16 in accordance with Integrated Digital Loop Carrier System General Requirements, Objectives, and Interface GR-303-CORE (hereinafter referred to as GR-303), a set of standard established by Bell Communications Research (Bellcore) for connecting digital loop carrier systems to central office switching systems. Local switch server 30 may be coupled to a second intelligent peripheral or equipment 32 that performs similar functions as intelligent peripheral 14.

Signal transfer points (STPs) 34 and 36 are cross-coupled and further coupled to local switch server 30, service unit 12, and service control points 40 and 42 via SS7 links. Signal transfer point 34 is also coupled to long distance networks 38. Service control point 40 may contain service definitions and logic for legacy services, and service control point 42 may contain service definitions and logic for intelligent network (IN) or advanced intelligent network (AIN) services. Intelligent network services may include toll-free calls (1-800 and 1-888), debit card calls, etc. Service control points 40 and 42 are coupled to a service management system (SMS) 44 via control and management links, which also couples service management system 44 to a service creation environment (SCE) 46 and an operational support system (OSS) 48. Service creation environment 46 includes a workstation that a service designer may use to define and deploy a new service. Operational support system 48 is also coupled to signal transfer point 36 and service unit 12. Operational support system 48 may include service support functions such as provisioning and billing systems, for example.

Because legacy class 5 switches such as local switch server 30 are monolithic and difficult and expensive to update to incorporate the new intelligent network services, architecture 10 shown in FIG. 1 is a way to add intelligent services to the legacy network. Call originations are processed by access delivery unit 16, service unit 12, and intelligent peripheral 14. For example, when a telephone service subscriber initiates a call from customer premises equipment 18, intelligent peripheral 14, at the instructions of service unit 12, provides a dial tone. As the subscriber dials an 1-800 number, intelligent peripheral 14 monitors and collects the dual tone multi-frequency (DTMF) dialed digits. Service unit 12, functioning as an external computer platform having call control screening intelligence for digital loop carrier 16, recognizes that this call is an intelligent network service call. Therefore service unit 12 temporarily suspends call processing in local switch server 30, and sends a query to service control point 42 (through signal transfer point 36) that contains service definitions and logic of the new intelligent network services. Service control point 42 looks up in a database the dialed 1-800 number and provides a translated number or destination address therefor. This translation information is communicated to service unit 12 which passes it on to local switch server 30. Local switch server 30 then proceeds to route the call in a normal manner according to the translation information. If the incoming call is not an intelligent network service call, then service unit 12 forwards the call directly to local switch server 30 for call processing.

Constructed in this manner, access delivery unit 16 and service unit 12 provides a call screening function to recognize intelligent network service calls that are not supported by the legacy network. Call processing functions such as destination address translation for the intelligent network service calls are performed by service unit 12 and a new service control point 42. Therefore, no expensive and time consuming upgrade of local switch server 30 is needed. The new network components to be added to accomplish this task include distributed switch 19 (including service unit 12, intelligent peripheral 14, and access delivery unit 16), a service control point 42 and a signal transfer point 36.

Figure 2:
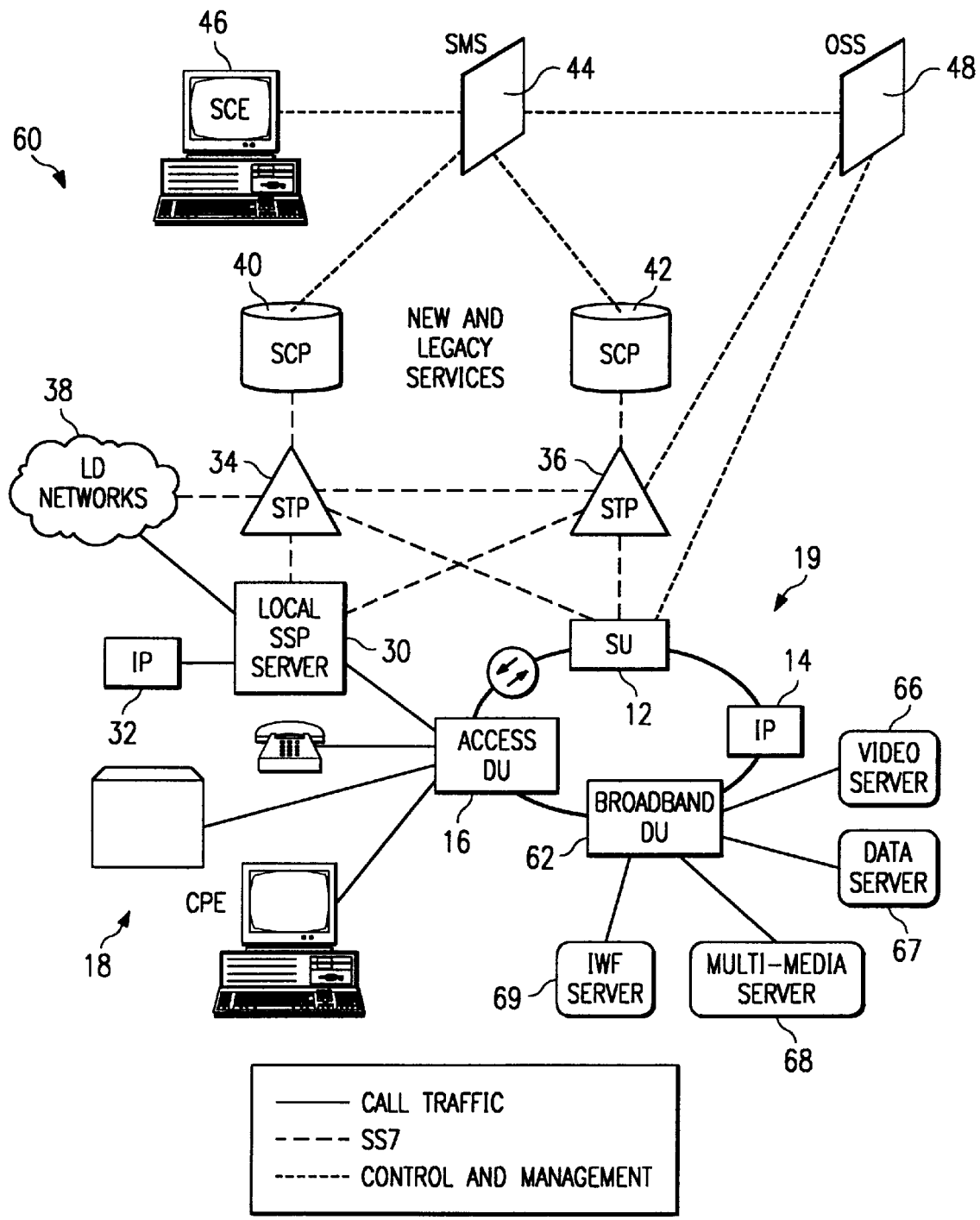
FIG. 2 is a simplified block diagram of an embodiment of a telecommunications network architecture providing for the addition of new services to a legacy network according to the teachings of the present invention.

FIG. 2 is a simplified block diagram of an embodiment of a telecommunications network architecture 60 providing for the addition of new services to a legacy network according to the teachings of the present invention. Telecommunications network 60 includes a service unit 12, which is coupled to an intelligent peripheral 14 and at least one access delivery unit 16. Service unit 12 is a general purpose computing platform that performs the call control and management functions, and may interact with the SS7 signaling network and external network management or operations systems. Digital loop carrier 16 acts as a switching platform of distributed switching system 19 under the control of service unit 12. Intelligent peripheral 14 is a specialized computing platform that provides central office call processing functions such as dial tone and digit collection. Intelligent peripheral 14 may be integrated with service unit 12. For a more detailed description of the distributed switch architecture, service unit, and delivery unit, please refer to Self et al.

Access delivery unit 16 is preferably a digital loop carrier which is coupled to a plurality of customer premises equipment 18. Digital loop carrier 16 may include a central office terminal (not shown) coupled with a remote terminal (not shown) with fiber or metallic cabling in the feeder network, as well as a host digital terminal stand-alone configuration in the wirecenter. Typically, digital loop carrier 16 includes channel banks and a time-slot-interchange (TSI) fabric.

A second delivery unit, a broadband delivery unit 62 is also coupled to service unit 12, intelligent peripheral 14, and access delivery unit 16. Broadband delivery unit 62 is in turn coupled to a number of servers providing new broadband services. For example, the servers providing new broadband services may include a video server 66, a data server 67, a multi-media server 68, and an interworking function server 69. Video server 66 is capable of processing and transmitting video signals. Data server 67 is coupled to internet service providers, for example. Multi-media server 68 is capable of processing and transmitting calls with video, audio, and data signals, for example. Interworking function server 69 may be capable of bridging between the signaling protocols of two different technologies, such as, narrowband (SS7, ISDN, etc.) and asynchronous transfer mode (ATM) broadband ISDN (BISDN), broadband ISDN user part (BISUP), and private network-to-network interface (PNNI), for example.

Access delivery unit 16 is coupled to a local service switching point (SSP) server 30. Local service switching point server 30 is a switch that may interface with access delivery unit 16 in accordance with GR-303. Local service switching point server 30 may be coupled to a second intelligent peripheral or equipment 32 that performs similar functions as intelligent peripheral 14.

Signal transfer points 34 and 36 are cross-coupled and further coupled to local service switching point server 30, service unit 12, and service control points 40 and 42 via SS7 links. Signal transfer point 34 is also coupled to long distance networks 38. Service control point 40 may contain service definitions and logic for legacy services, and service control point 42 may contain service definitions and logic for intelligent network and new broadband services. Alternatively, service control points 40 and 42 may both include the service definition and logic of both legacy and new services. Service control points 40 and 42 are coupled to a service management system 44 via control and management links, which also couples service management system 44 to a service creation environment 46 and an operational support system 48. Service creation environment 46 includes a workstation that a service designer may use to define and deploy a new service. Operational support system 48 is also coupled to signal transfer point 36 and service unit 12. Operational support system 48 may include service support functions such as provisioning and billing systems, for example.

In this architecture, call origination is processed by access delivery unit 16, service unit 12, and intelligent peripheral 14. As the subscriber initiates a call from customer premises equipment 18, intelligent peripheral 14 provides the dial tone under the service unit's control. The dialed digits are monitored and collected by intelligent peripheral 14 and provided to service unit 12. The call control screening intelligence in service unit 12 is able to differentiate the call. For example, the user may dial a service code which is indicative of a new service not supported by local service switching point server 30, or the call setup message of an integrated services digital network call may contain the information needed, or the dialed digits represent the destination address of a know internet service provider. Service unit 12, based on the information received, may provide a database lookup function to determine whether this call required new broadband services. If not, the call is simply forwarded to local service switching point server 30 to process and route normally. If the call is a new broadband service call, then the call is forwarded to broadband delivery unit 62 and routed to the appropriate server 66–69.

In both architectures 10 and 60 to support new intelligent network services and broadband services, access delivery unit 16 may operate similarly to perform the hand-off function. If the call required new intelligent network or broadband services, access delivery unit 16 may signal an on-hook to local service switching point server 30 to drop processing of the call, and then route the call directly using normal interoffice routing and signaling. Access delivery unit 16 may optionally signal a "make busy" status to local service switching point server 30 by one of several configurable techniques. Without a signal, an incoming call to the subscriber would simply ring unanswered while the circuit is in service, as local service switching point server 30 would be unaware that the line is in use.

Figure 3:
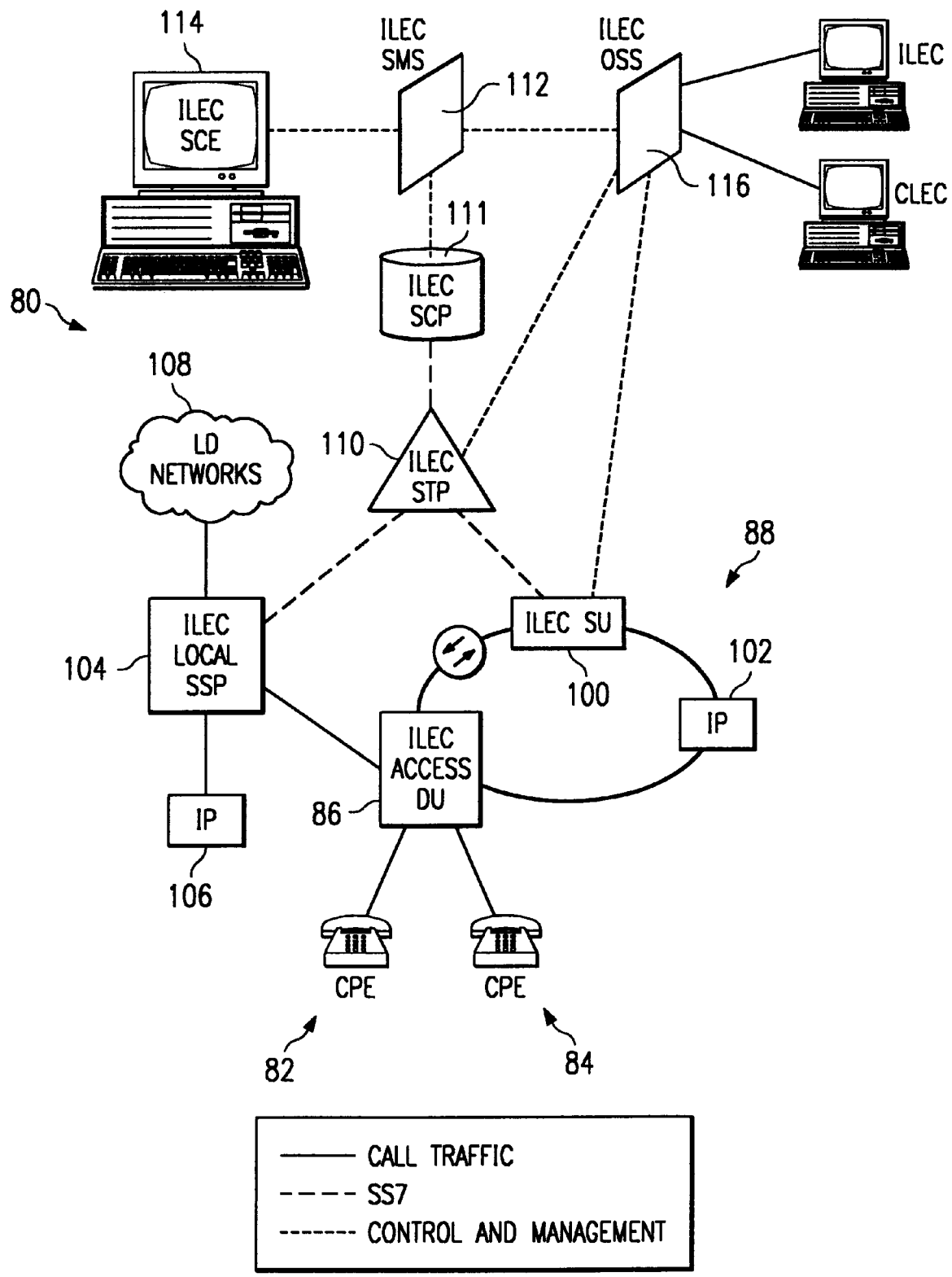
FIG. 3 is a simplified block diagram of an embodiment of a telecommunications network architecture accommodating a local services switchless reseller or competitive local exchange carrier according to the teachings of the present invention.

FIG. 3 is a simplified block diagram of an embodiment of a telecommunications network architecture 80 accommodating a local services switchless reseller according to the teachings of the present invention. In today's telecommunications industry, it is possible for a start up long distance telephone company to operate by purchasing time from a long distance company such as MCI at a bulk rate and reselling the time to its long distance subscribers. Therefore the start up long distance company does not have to own any equipment in order to be in business. With deregulation of the local phone service industry, similar switchless resale of local services becomes a business possibility. Accordingly, telecommunications network architecture 80 is constructed to accommodate this business opportunity and also provide the flexibility to provide different services by the incumbent local exchange carrier (ILEC) which existed prior to deregulation, and the competitive local exchange carrier (CLEC) which is a switchless reseller that comes into being after deregulation.

Telecommunications network 80 includes customers 82 of the incumbent local exchange carrier and customers 84 of one or more competitive local exchange carrier, all of which are coupled to an access delivery unit 86 owned by the incumbent local exchange carrier. Access delivery unit 86 is part of a distributed switch 88, which also includes one or more other delivery units (not shown), a service unit 100 and an intelligent peripheral 102, also owned by the incumbent local exchange carrier. Service unit 100 is a general purpose computing platform that performs the call control and management functions, and may interact with the SS7 signaling network and external network management or operations systems. Access delivery unit 86 is preferably a digital loop carrier that acts as a switching platform of distributed switching system 88 under the control of service unit 100. Intelligent peripheral 102 is a specialized computing platform that provides central office call processing functions such as dial tone and digit collection. Intelligent peripheral 102 may be integrated with service unit 100. Please refer to Self et al. for details of the distributed switch architecture.

Access delivery unit 86 is coupled to a local service switching point 104 also owned by the incumbent local exchange carrier. Local service switching point 104 is a switch that may interface with access delivery unit 86 in accordance with GR-303. Local service switching point 104 may be coupled to an intelligent peripheral 106. Local service switching point 104 is coupled to long distance networks 108 for routing long distance telephone calls.

Service unit 100 and local switching point 104 are both coupled, via SS7 link sets, to a signal transfer point 110 owned by the incumbent local exchange carrier. Service switching point 104 is also coupled to a service control point 111 owned by the incumbent local exchange carrier. Service control point 111 may contain service definitions and logic for services offered by both the incumbent local exchange carrier as well as the competitive local exchange carrier. Service control point 111 is coupled to a service management system 112 via control and management links, which also couples service management system 112 to a service creation environment and an operational support system 116, all of which are owned by the incumbent local exchange carrier. Operational support system 116 is accessible by both the incumbent local exchange carrier and the competitive local exchange carrier to provide their own operational support, provisioning and billing functions.

Accordingly, in architecture 80, a competitive local exchange carrier or switchless reseller is able to share all the network elements with an incumbent local exchange carrier. Separate management and billing feeds may be provided for the competitive local exchange carrier, and separate service and call partitions are provided within service unit 100, service control point 111, service management system 112, and service creation environment 114. In this manner, the competitive local exchange carrier may design and provide its own service logic and definitions for unique services not provided by the incumbent local exchange carrier. Depending on which line the subscriber call is coming in to access delivery unit 86, service unit 100 is able to perform a database lookup function and differentiate between the subscribers of the incumbent local exchange carrier and the subscribers of the competitive local exchange carrier. Service unit 100 may support call control and screening intelligence for multiple local exchange carriers. Depending on which local exchange carrier the subscriber has chosen for services, the call is processed and routed according to the incumbent or competitive local exchanger carrier's set of call logic programs and service definition.

Figure 4:
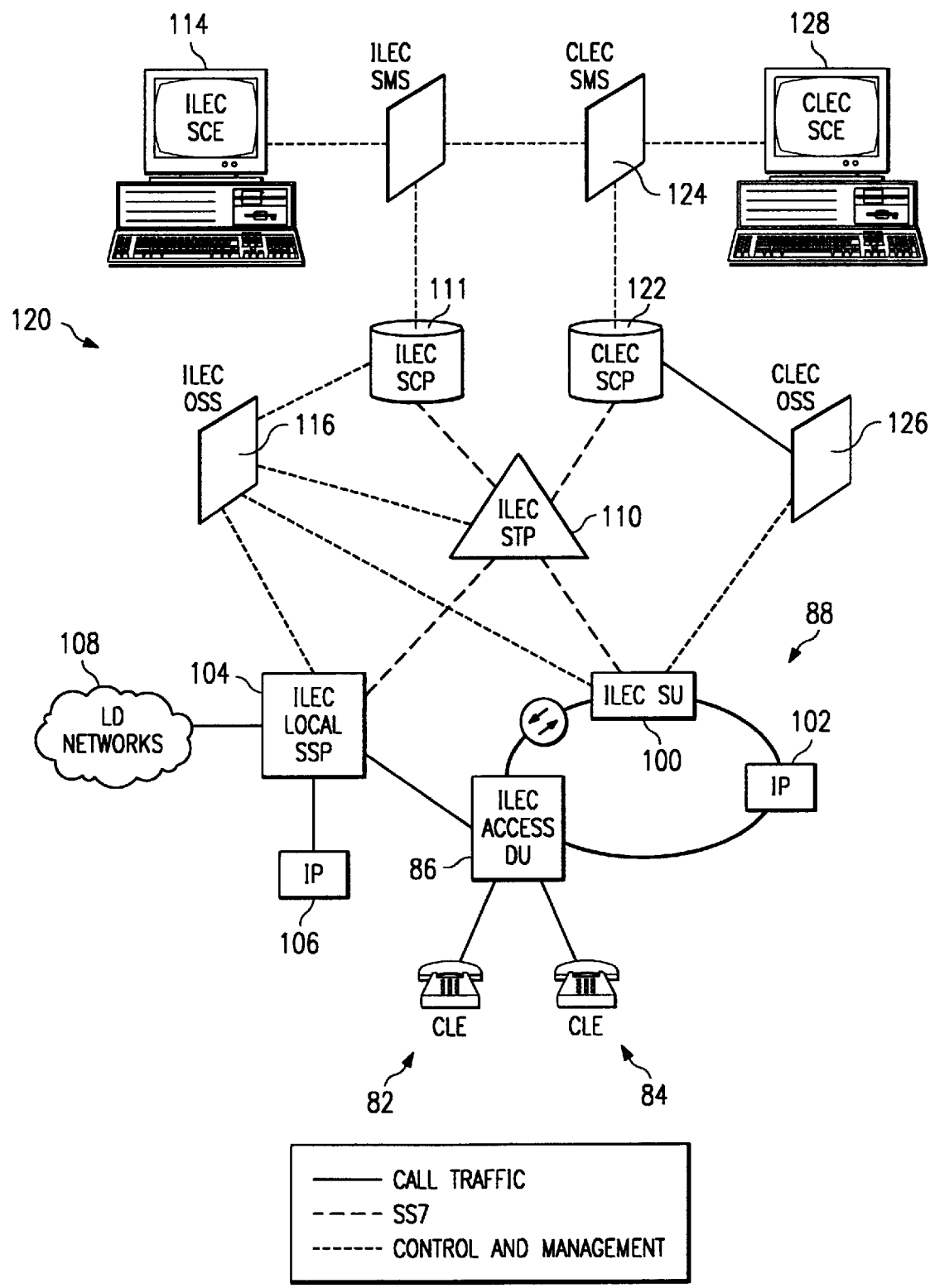
FIG. 4 is a simplified block diagram of another embodiment of a telecommunications network architecture accommodating a local services switchless reseller or a competitive local exchange carrier according to the teachings of the present invention.

FIG. 4 is a simplified block diagram of an alternative embodiment of a telecommunications network architecture 120 accommodating a local services switchless reseller according to the teachings of the present invention. Telecommunications network 120 includes customers 82 of the incumbent local exchange carrier and customers 84 of one or more competitive local exchange carrier, all of which are coupled to one or more access delivery unit 86 owned by the incumbent local exchange carrier. Access delivery unit 86 is part of a distributed switch 88, which may include one or more other delivery units (not shown), a service unit 100, and an intelligent peripheral 102. All of the components of distributed switch 88 are owned by the incumbent local exchange carrier.

Access delivery unit 86 is coupled to a local service switching point 104 also owned by the incumbent local exchange carrier. Local service switching point 104 may be coupled to an intelligent peripheral 106. Local service switching point 104 is coupled to long distance networks 108 for routing long distance telephone calls. Service unit 100 and local switching point 104 are both coupled, via SS7 link sets, to a signal transfer point 110 owned by the incumbent local exchange carrier. Service switching point 104 is in turn coupled to a service control point 111 owned by the incumbent local exchange carrier and a service control point 122 owned by the competitive local exchange carrier. Service control point 111 contains service definitions and logic for services offered by the incumbent local exchange carrier, and service control point 122 contains service definitions and logic for services offered by the competitive local exchange carrier. Service control point 111 is coupled to a service management system 112 and an operational support system 116, both owned by the incumbent local exchange carrier. Service management system 112 is coupled to an incumbent local exchange carrier owned service creation environment 114.

Service creation environment 122 owned by the competitive local exchange carrier is coupled to other intelligent network components owned by the competitive local exchange carrier, including a system management system 124, and an operational support system 126.

In telecommunications network architecture 120, a competitive local exchange carrier is entitled to negotiate connection agreements for local services and use of the incumbent local exchange carrier's distributed switch 88, local service switching point 104, and signal transfer point 110 owned by the incumbent local exchange carrier as in architecture 80 shown in FIG. 3 and described above. However, instead of sharing the intelligent network components with the incumbent local exchange carrier, the competitive local exchange carrier owns some or all of the intelligent network components, which may include the service control point, system management system, service creation environment, and operational support system. The competitive local exchange carrier may design and provide its own service logic and definitions for unique services not provided by the incumbent local exchange carrier. Depending on which line the subscriber call is coming in to access delivery unit 86, service unit 100 is able to perform a database lookup function and differentiate between the subscribers of the incumbent local exchange carrier and the subscribers of the competitive local exchange carrier. Service unit 100 may support call control and screening intelligence for multiple local exchange carriers. Depending on which local exchange carrier the subscriber has chosen for services, the call is processed and routed according to the incumbent local exchange carrier's set of call logic programs and service definition stored in service control point 111, or the competitive local exchange carrier's set of call logic programs and service definition stored in service control point 122. With its own intelligent network components, the competitive local exchange carrier is able to design and create its own services, manage the deployment of the services, and create billing for the services without sharing the incumbent local exchanger carrier's equipment and resources.

Figure 5:
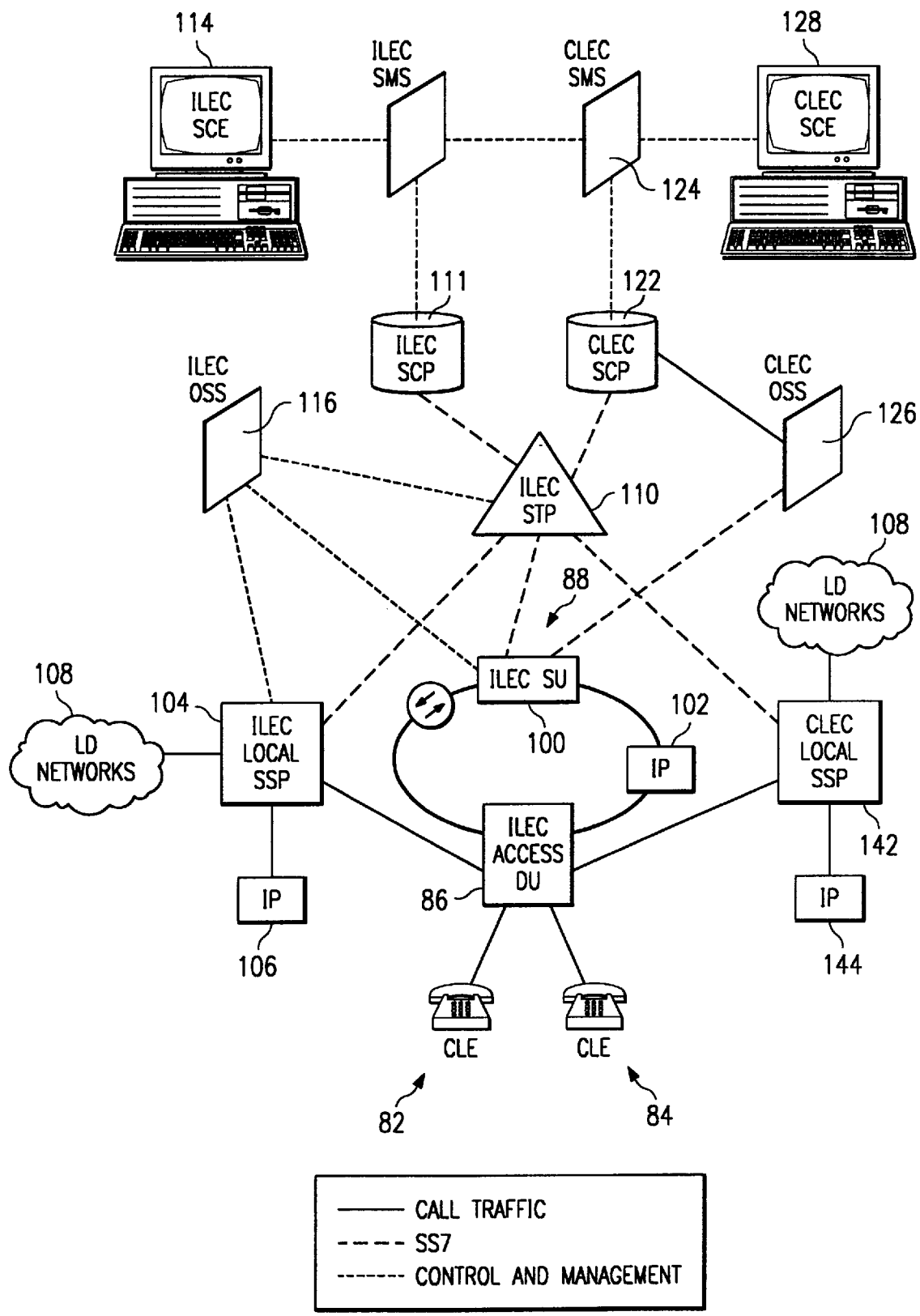
FIG. 5 is a simplified block diagram of an embodiment of a telecommunications network architecture providing for shared local access management between an existing local exchange carrier and a competitive local exchange carrier according to the teachings of the present invention.

FIG. 5 is a simplified block diagram of an embodiment of a telecommunications network architecture 140 providing for shared local access management between an incumbent local exchange carrier and a competitive local exchange carrier according to the teachings of the present invention. Telecommunications network architecture 140 is similar to architecture 120 shown in FIG. 4, and includes customers 82 of the incumbent local exchange carrier and customers 84 of one or more competitive local exchange carrier, all of which are coupled to one or more access delivery unit 86 owned by the incumbent local exchange carrier. Access delivery unit 86 is part of a distributed switch 88, which may include one or more other delivery units (not shown), a service unit 100, and an intelligent peripheral 102. All of the components of distributed switch 88 are owned by the incumbent local exchange carrier.

Access delivery unit 86 is coupled to a local service switching point 104 owned by the incumbent local exchange carrier, as well as a local service switching point 142 owned by the competitive local exchange carrier. Incumbent local exchange carrier's local service switching point 104 may be coupled to an intelligent peripheral 106, and competitive local exchange carrier's local service switching point 142 may be coupled to its own intelligent peripheral 144, also owned by the competitive local exchange carrier. Both local service switching points 104 and 142 are coupled to long distance networks 108 for routing long distance telephone calls.

Service unit 100 and local switching points 104 and 142 are coupled, via SS7 link sets, to a signal transfer point 110 owned by the incumbent local exchange carrier. Service switching point 104 is in turn coupled to a service control point 111 owned by the incumbent local exchange carrier, and service switching point 142 is coupled to a service control point 122 owned by the competitive local exchange carrier. Service control point 111 contains service definitions and logic for services offered by the incumbent local exchange carrier, and service control point 122 contains service definitions and logic for services offered by the competitive local exchange carrier. As in architecture 120, the incumbent local exchange carrier has a set of intelligent network nodes, including service control point 111, a service management system 112, and a service creation environment 114. The competitive local exchange carrier also has its own intelligent network nodes, including service creation environment 122, a system management system 124, and an operational support system 126.

In telecommunications network architecture 140, a competitive local exchange carrier may negotiate interconnection agreements for incumbent local exchange carrier's local services and use of distributed switch 88 and signal transfer point 110 owned by the incumbent local exchange carrier. However, instead of sharing the intelligent network components and the service switching point with the incumbent local exchange carrier, the competitive local exchange carrier owns some or all of the components, which may include the service control point, system management system, service creation environment, operational support system, and service switching point. The competitive local exchange carrier may design and provide its own service logic and definitions for unique services not provided by the incumbent local exchange carrier. Depending on which line the subscriber call is coming in to access delivery unit 86, service unit 100 is able to perform a database lookup function and differentiate between the subscribers of the incumbent local exchange carrier and the subscribers of the competitive local exchange carrier. Service unit 100 may support call control and screening intelligence for multiple local exchange carriers. Depending on which local exchange carrier the subscriber has chosen for service, i.e. which line the call is coming in from, the call is processed and routed according to the incumbent local exchange carrier's set of call logic programs and service definition stored in service control point 111, or the competitive local exchange carrier's set of call logic programs and service definition stored in service control point 122. With its own intelligent network components, the competitive local exchange carrier is able to design and create its own services, manage the deployment of the services, and create billing therefor without sharing the incumbent local exchanger carrier's equipment and resources.

Although several embodiments of the present invention and its advantages have been described in detail, it should be understood that mutations, changes, substitutions, transformations, modifications, variations, and alterations can be made therein without departing from the teachings of the present invention, the spirit and scope of the invention being set forth by the appended claims.

What is claimed is:

1. A telecommunications network for providing intelligent network services, comprising:

a distributed switching system having a call control computing platform coupled to a digital loop carrier, the digital loop carrier being coupled to a plurality of telephone service subscribers;

a local switch being coupled to the digital loop carrier; and at least one service control point being coupled to the call control computing platform and the local switch, the at least one service control point containing service definitions and logic of legacy services and intelligent network services, wherein the call control computing platform is operable to determine whether an incoming call is a legacy call or an intelligent network call capable of being routed by the local switch or an intelligent network call not supported by the local switch, the call control computing platform operable to forward the supported legacy or intelligent network call to the local switch for processing, the call control computing platform operable to forward the unsupported intelligent network call to a delivery unit in the distributed switching system for processing.

2. The telecommunications network, as set forth in claim 1, further comprising an intelligent peripheral coupled to the call control computing platform and digital loop carrier adapted to provide tone and announcement and digit collection functions.

3. The telecommunications network, as set forth in claim 1, wherein the at least one service control point comprises:

a first service control point containing service definitions and logic of legacy services; and a second service control point containing service definitions and logic of intelligent network services.

4. The telecommunications network, as set forth in claim 1, wherein the digital loop carrier interfaces with the local switch via a GR-303 protocol.

5. The telecommunications network, as set forth in claim 1, further comprising:

a signal transfer point coupled to the local switch, call control computing platform, and the at least one service control point via SS7 linksets;

a service management system coupled to the at least one service control point;

a service creation environment coupled to the service management system; and an operational support system coupled to the call control computing platform and signal transfer point.

6. A telecommunications network for providing intelligent network services in a legacy network, comprising:

at least one digital loop carrier being coupled to a plurality of telephone service subscribers;

a call control computing platform coupled to the at least one digital loop carrier, the call control computing platform being adapted to control and manage the operations of the at least one digital loop carrier;

an intelligent peripheral coupled to the call control computing platform and the at least one digital loop carrier and being adapted to provide tone and announcement and digit collection functions;

a local switch being coupled to the at least one digital loop carrier;

a first service control point being coupled to the call control computing platform and the local switch, and containing service definitions and logic of legacy services; and a second service control point being coupled to the call control computing platform and the local switch, and containing service definitions and logic of new intelligent network services, wherein the call control computing platform is operable to determine whether an incoming call is a legacy call or an intelligent network call capable of being routed by the local switch or an intelligent network call not supported by the local switch, the call control computing platform operable to forward the supported legacy or intelligent network call to the local switch for processing, the call control computing platform operable to forward the unsupported intelligent network call to a delivery unit in the distributed switching system for processing.

7. The telecommunications network, as set forth in claim 6, wherein the digital loop carrier interfaces with the local switch via a GR-303 protocol.

8. The telecommunications network, as set forth in claim 6, further comprising:

a signal transfer point coupled to the local switch, call control computing platform, and the at least one service control point via SS7 linksets;

a service management system coupled to the at least one service control point;

a service creation environment coupled to the service management system; and an operational support system coupled to the call control computing platform and signal transfer point.

9. The telecommunications network, as set forth in claim 6, wherein the local switch is further coupled to long distance networks.

10. A method for providing new intelligent network services to a legacy network, comprising the steps of:

monitoring for line events occurring on a plurality of subscriber lines coupled to a digital loop carrier;

providing dial tone and collect dialed digits for a call on one of the plurality of subscriber lines in response to an off-hook event thereon;

determining whether the call requires legacy service or a new intelligent network service;

determining whether the new intelligent service is supported by a local switch:

forwarding the call to a local switch for call processing and routing in response to the call requiring legacy service or intelligent service supported by the local switch; and forwarding the call to a delivery unit coupled to the digital loop carrier for call processing and routing in response to the call requiring new intelligent network services not supported by the local switch.

11. The method, as set forth in claim 10, wherein the call processing step in the service unit comprises the step of querying a service control point for a destination address for the new intelligent network service call, the service control point containing service definition and logic for the new intelligent network services.

12. The method, as set forth in claim 10, wherein the determining step comprises the step of looking up the collected digits in a database.

13. The method, as set forth in claim 10, wherein the determining step comprises the step of examining the contents of a call setup message received by the digital loop carrier from the subscriber line.

* * * * *